(12) United States Patent
de Carvalho et al.

(10) Patent No.: US 9,787,948 B2
(45) Date of Patent: Oct. 10, 2017

(54) VIRTUAL WINDOW FOR AIRCRAFT

(71) Applicant: EMBRAER S.A., Sao Jose dos Campos (BR)

(72) Inventors: Carlos Eduardo de Carvalho, Sao Jose dos Campos (BR); Alessandro Vassallo, Sao Jose dos Campos (BR); Amanda Oliveira do Carmo, Sao Jose dos Campos (BR); Andre Gasparotti, Sao Jose dos Campos (BR); Bruno Kimura Castanha, Sao Jose dos Campos (BR); Carlos Augusto Fernandes Filho, Sao Jose dos Campos (BR); Carlos Marcelo Campos Teixeira, Sao Jose dos Campos (BR); Carlos Rosley Bernardes, Sao Jose dos Campos (BR); Demetrio Andrade de Campos, Sao Jose dos Campos (BR); Douglas Goncalves de Albuquerque, Sao Jose dos Campos (BR); Emmanuel Basile Garakis, Sao Jose dos Campos (BR); Fernanda Loth Pugliesi, Sao Jose dos Campos (BR); Flavia Renata Dantas Alves Silva Ciaccia, Sao Jose dos Campos (BR); Luz Maria Romero Tarazona, Sao Jose dos Campos (BR); Mateus Rodrigues Miranda, Sao Jose dos Campos (BR); Mauri Mendes de Oliveira, Sao Jose dos Campos (BR); Ricardo Athayde Abelheira, Sao Jose dos Campos (BR); Silvio Hideo Lemos Mochiduky, Sao Jose dos Campos (BR); Sergio Raphael Fonseca Affonso, Sao Jose dos Campos (BR); Walter Affonso Junior, Sao Jose dos Campos (BR)

(73) Assignee: Embraer S.A., São José dos Campos (BR)

( * ) Notice: Subject to any disclaimer, the term of this patent is extended or adjusted under 35 U.S.C. 154(b) by 460 days.

(21) Appl. No.: 13/690,145

(22) Filed: Nov. 30, 2012

(65) Prior Publication Data

US 2013/0169807 A1 Jul. 4, 2013

Related U.S. Application Data

(60) Provisional application No. 61/580,171, filed on Dec. 23, 2011.

(51) Int. Cl.
 *H04N 7/18* (2006.01)
 *B64D 11/00* (2006.01)

(52) U.S. Cl.
 CPC ..... *H04N 7/183* (2013.01); *B64D 2011/0061* (2013.01)

(58) Field of Classification Search
 CPC ... H04N 7/18; H04N 7/183; B64D 2011/0061
 (Continued)

(56) References Cited

U.S. PATENT DOCUMENTS 5,875,997 A 3/1999 Al-Sabah
7,088,310 B2 * 8/2006 Sanford ............................ 345/7
(Continued)

*Primary Examiner* — Thai Tran
*Assistant Examiner* — Nien-Ru Yang
(74) *Attorney, Agent, or Firm* — Nixon & Vanderhye P.C.

(57) ABSTRACT

To create an environment in which the passenger has the same emotion, feel and visual experience that a pilot has with regard to freedom of flight and proximity to the exterior of the aircraft and where passengers have the impression that they are looking out of an actual panoramic window, a "virtual window" includes internal and the external aspects of a real window. The internal part can comprise a folded or flexible high resolution color display that conforms to the internal profile of the aircraft fuselage as if it were an actual
(Continued)

Internal part of the virtual window showing a panoramic view from outside of the aircraft window. The external part comprises a paint scheme that is indistinguishable from an actual window and which is placed on the outside of the aircraft fuselage in registry with the conformal display in the aircraft's interior.

23 Claims, 5 Drawing Sheets

(58) Field of Classification Search
USPC .......................................................... 348/144
See application file for complete search history.

(56) References Cited

U.S. PATENT DOCUMENTS

| 7,777,718 | B2* | 8/2010 | Franko | B64D 11/0015 |
| | | | | 345/156 |
| 2008/0179457 | A1 | 7/2008 | Guering | |
| 2008/0318011 | A1* | 12/2008 | Chaussade | B32B 17/10045 |
| | | | | 428/210 |
| 2009/0127386 | A1* | 5/2009 | Cote | B64D 47/06 |
| | | | | 244/1 R |
| 2010/0014009 | A1* | 1/2010 | Stavaeus | B64D 11/0015 |
| | | | | 348/837 |
| 2010/0157063 | A1* | 6/2010 | Basso et al. | 348/169 |
| 2011/0279741 | A1* | 11/2011 | Smallhorn | B64D 11/0015 |
| | | | | 348/837 |

* cited by examiner

Figure 1A: Example Non-Limiting Prior Art Cockpit and Windshield

Figure 1B: Example Non-Limiting Prior Art Windshield

Figure 2: Side view illustration of an example non-limiting virtual window on board an aircraft Figure 3: Internal part of the virtual window showing a panoramic view from outside of the aircraft Figure 4: External part of the virtual window

Figure 5

VIRTUAL WINDOW FOR AIRCRAFT

CROSS-REFERENCES TO RELATED APPLICATIONS

This application claims the benefit of provisional application No. 61/580,171 filed Dec. 23, 2011, incorporated herein by reference.

FIELD

The technology herein relates to aeronautical user interfaces, and more particularly to systems and methods to provide a new and privileged view of the flight for passengers through a virtual window.

BACKGROUND AND SUMMARY

Aircraft manufacturers are constantly striving to increase comfort and provide more pleasurable flight experience for their passengers. Over the years, many innovations have been introduced in the aircraft cabin in order to provide more comfort to passengers. But even considering these developments, the main interface between the exterior of the aircraft and the passenger are the windows. Through the windows, the passenger can see if it is daytime or night and often, the earth below the aircraft. Some passengers love to look out the window and watch the amazing patterns on the earth far below. Checkerboard mosaics of cultivated farmland give way to austere desert rock formations, breathtaking snow-covered mountainous peaks and fractally-intricate shorelines.

Although looking out a side porthole window can be fun and informative, the passengers looking out the porthole window typically do not have a panoramic view of the horizon similar to what the pilots see through their panoramic cockpit windshield. Seeing where the plane is going, what is ahead and the blue yonder before and above the airplane can be exciting and comforting to passengers.

Previous work has been done in the past. One prior approach provides a flight portal apparatus for displaying a virtual view of a surface of the earth below an aircraft. This allows the passenger to see a virtual view of the surface of the earth below an aircraft, but does not show a panoramic view such as the view that the pilots have. Additionally, some aircraft make use of the same video displays used to show movies to passengers to provide additional virtual imagery concerning the flight. For example, many aircraft can display a map showing the airplane's current position. Some aircraft are also able to display a view of the runway during landing. Once again however, such video screen views create neither the appearance nor the impression of being able to view a panorama of the sky similar to what the pilots in the cockpit can see.

Another proposed approach uses a different aircraft configuration in order to provide a passenger cabin which, at the front of the fuselage, has a pointed portion extending above the cockpit and at a level of which the fuselage is provided with a row of real windows forming a panoramic window wall. This is an interesting solution but probably could be implemented only in a large airplane. It also does not have the facilities of a virtual window in terms of implementation constraints.

Yet another approach presents an aircraft having a raised and rearward positioned cockpit; a passenger compartment positioned in a forward end of the main aircraft body; a real passenger window which extends across the forward end of the main aircraft body for forward viewing by passengers positioned in the passenger compartment. Once again, this solution has several implementation difficulties by proposing a raised and rearward positioned cockpit.

It would be desirable to give passengers the impression of being able to look out of a "picture window" or panoramic cockpit windshield at the horizon and the sky above and before the airplane without having to modify the airplane fuselage to cut openings and without needing to comprise safety and other concerns that might be implicated by providing additional exterior windows in the aircraft fuselage.

An example non-limiting technology herein creates an environment in which the passenger has the same emotion, feel and visual experience that a pilot has with regard to freedom of flight and proximity to the exterior of the aircraft and where passengers have the impression that they are looking out of a real panoramic window. The creation of such environment is accomplished through a "virtual window" according to an example non-limiting embodiment. To comprise the internal and the external aspects of a real window, an example non-limiting virtual window according to the example non-limiting embodiment has two main parts: an internal part and an external part. The internal part can comprise a folded or flexible high resolution color display that conforms to the internal profile of the aircraft fuselage as if it were an actual window. The external part comprises a paint or decal scheme that is indistinguishable from an actual window and which is placed on the outside of the aircraft fuselage in registry with the conformal display in the aircraft's interior. Thus, passengers looking at the exterior of the aircraft are led to believe that a window exists at that location in the aircraft, and once they get inside the aircraft the passengers see images on the flexible conformal display that are precisely the same as or at least consistent with what they would see if an actual window were present at that location in the aircraft. The passenger thus has the illusion of looking through a real panoramic window in the aircraft fuselage.

Some advantages of the example non-limiting embodiment include:
- the example non-limiting embodiment provides a different passenger flight experience;
- the example non-limiting embodiment provides a panoramic view (similar to the pilots' view) during the flight through the use of existing technologies (Flexible organic light emitting diode screen display or "FOLED", for example) in a virtual window and eliminating the need of a real window for this purpose (e.g., of providing a panoramic view);
- From the point of view of external appearance of the airplane, with the example non-limiting embodiment the aircraft becomes differentiated through the external representation of the virtual window, with a low cost of implementation, through a paint scheme;
- the example non-limiting embodiment provides a solution that does not impact the position of the cockpit and does not increase the wet area of the aircraft.

An example non-limiting embodiment comprises:
- means of capturing the external images (for example, a camera system) connected to a data processing system;
- said data processing system located in internal side of the aircraft and connected to the internal flexible display which shows the external images; and
- an user interface connected to the data processing system.

BRIEF DESCRIPTION OF THE DRAWINGS

These and other features and advantages will be better and more completely understood by referring to the following detailed description in connection with the drawings, of which.

DETAILED DESCRIPTION

Figure 1A:
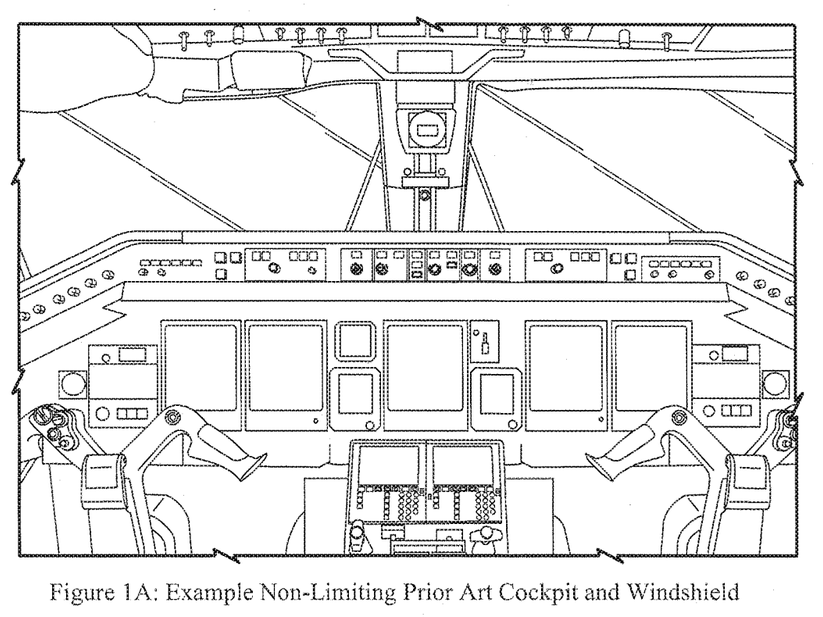
FIGS. 1A & 1B show an example view of a pilot through a prior art non-limiting aircraft windshield.
Figure 1B:
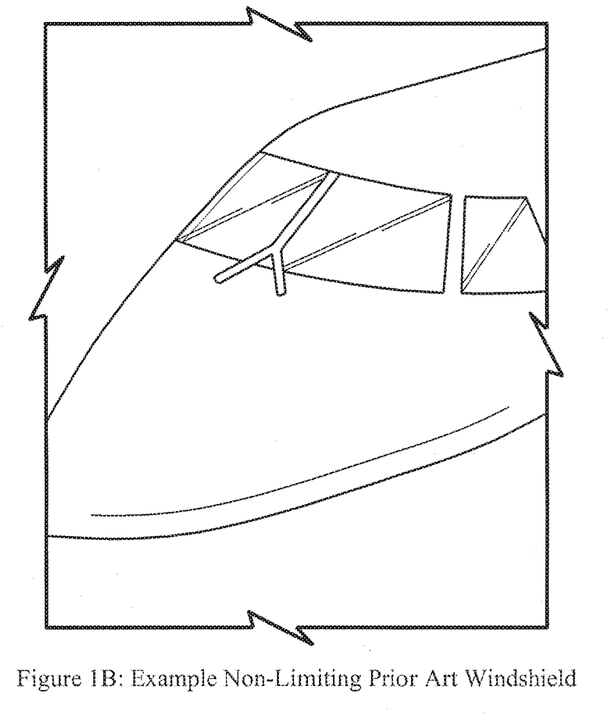

FIGS. 1A & 1B show an example prior art aircraft illustrating a jet windshield design that gives the pilot a panoramic view of the horizon. As can be seen, the window panels are formed in a curved wraparound design to provide a panoramic view with good visibility in all directions. An example non-limiting implementation of a virtual window display provided herein creates the impression and feel of an additional such a panoramic window above the cockpit window for example without requiring any expensive modifications or special aircraft fuselage designs. Such an example non-limiting implementation provides an environment in which the passenger has the same perspective, feel and emotion that a pilot has with regard to freedom of flight and proximity to the exterior of the aircraft.

The creation of such an environment is accomplished through a virtual window according to the example non-limiting embodiment. To comprise the internal and the external aspects of a real window, the virtual window according to the example non-limiting embodiment has two main parts: an internal part and an external part.

Figure 2:
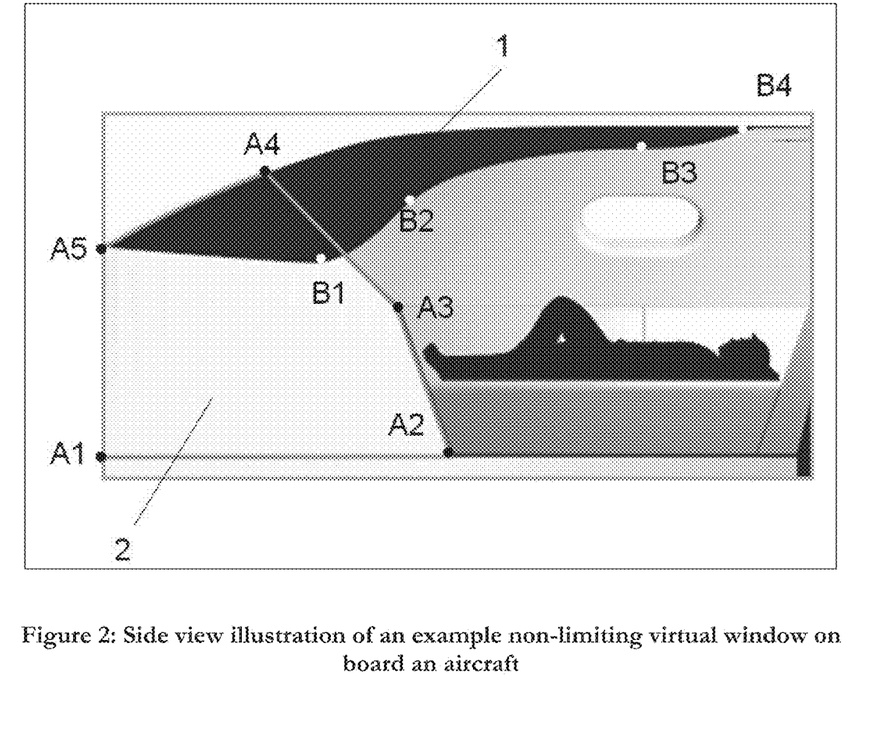
FIG. 2 is a side view illustration of an example non-limiting virtual window.
Figure 3:
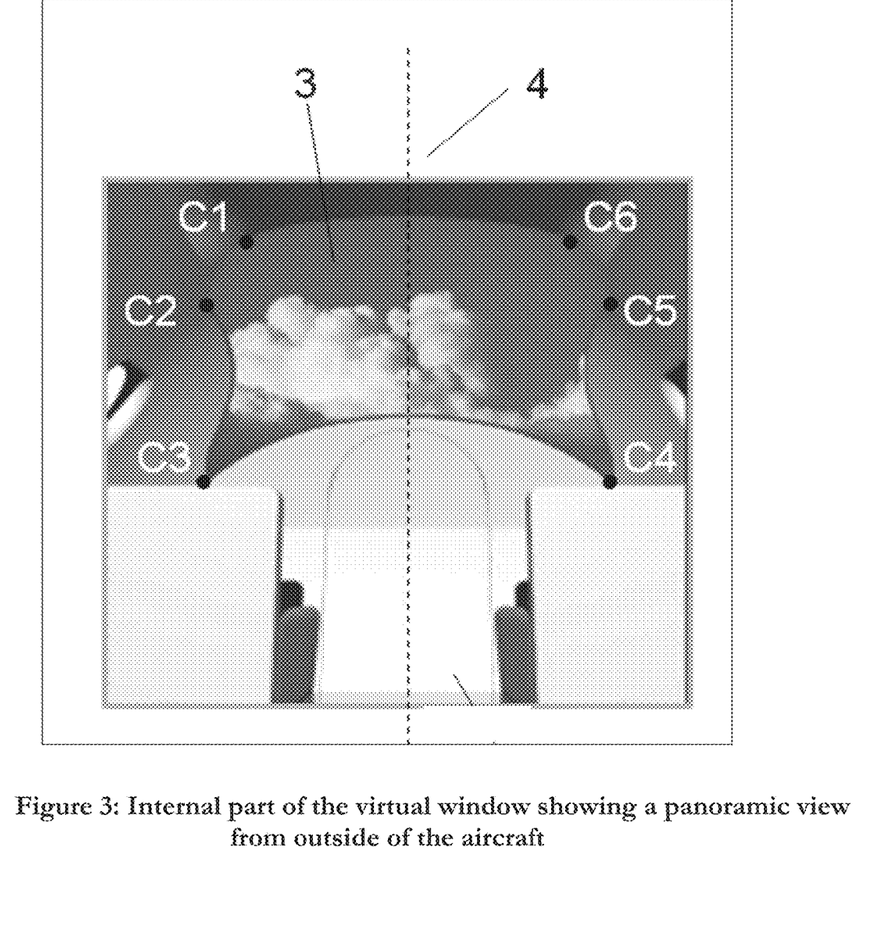
FIG. 3 shows an example non-limiting internal part of the virtual window providing a panoramic view from outside of the aircraft.
Figure 4:
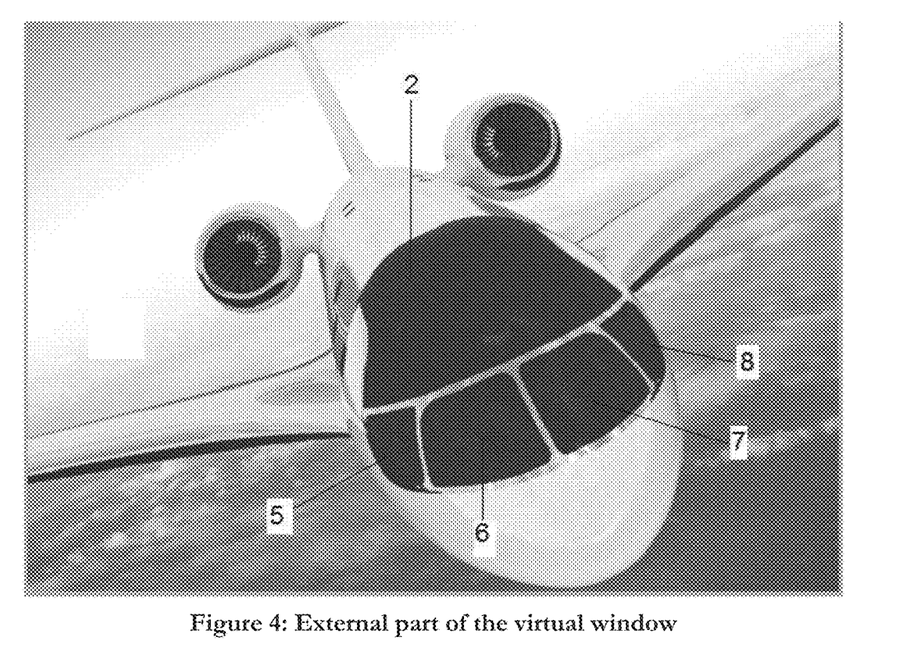
FIG. 4 shows an example non-limiting external part of the virtual window.

As shown in FIGS. 2, 3 and 4, the internal part of the virtual window comprises an internal screen (e.g., an electronic display) positioned on the aircraft ceiling in the forward region of the cabin adjacently to the windshield. The external part of the virtual window comprises a painting scheme on the external surface of the aircraft fuselage (see FIG. 4). This virtual window provides a sense of permeability between the outside and inside of the aircraft through the reproduction of images externally captured and internally transmitted in real time.

The virtual window emulates a large actual transparent window on the aircraft ceiling. As this is a virtual window, there is no need to cut holes or otherwise modify the airplane structure or fuselage. The internal part of the virtual window may comprise a flexible conformal display capable of being pressed into conformance over the interior ceiling finishing or even integrated on the interior ceiling finishing (e.g., seamless transition or flush finishing). In one example non-limiting embodiment, such flexible display is positioned adjacent to the cockpit windshield region and shows the external viewing captured by a camera installed outside of the aircraft, as depicted in FIG. 3.

To provide the external aspect of a window, the external part of the virtual window comprises a paint scheme on the external surface of the aircraft, matching in registration with the area of the internal part of the virtual window. This paint scheme emulates a window with a solar film protection applied, as can be seen in FIG. 4. When the passengers are outside the aircraft, they may have the impression of the presence of the actual additional window through this paint scheme.

The example non-limiting embodiment gives to the passenger an impression that there really is an additional panorama window at that location in the aircraft. Once the passenger reaches the interior of the aircraft he will see the display which matches with the external paint scheme and thus continues to emulate the presence of a window at that location.

The virtual window according to the example non-limiting embodiment gives to passengers the same feeling (and the same sense) the pilots have with respect to the freedom of flight and to the proximity to the exterior of the aircraft. By the presented virtual window, the passengers may have a view of the horizon as the pilots usually have by looking through a real panoramic cockpit window.

In one example non-limiting implementation, the shape of the area of the virtual window adopts flowing lines that follow the cylindrical shape of the fuselage, seeking to maintain a visual language that combines with the external, internal and general language of an aircraft.

As can be seen in FIG. 2, the internal part of virtual window may comprise a flexible display which is positioned on the aircraft ceiling in the forward region of the cabin adjacent to the windshield region. The virtual window extends upwardly from the windshield region. Alternatively, such flexible display, which composes the internal part of the virtual window, may extend upwardly from a region which is close (next) to the windshield region.

FIG. 2 presents a side view of the virtual window (1) which is represented by the points A4, A5, B1, B2, B3 and B4. In this figure, the reference number 2 references the cockpit region.

As shown in FIG. 3, the area of the internal part of the virtual window (3) is bounded by a set of curves defined by the points C1, C2, C3, C4, C5 and C6.

As depicted in FIG. 3, the borders of the internal part of the virtual window comprise flowing lines.

Relative to the passengers' view, as shown in FIG. 3, the left lateral border of the internal part of the virtual window (3) in one example non-limiting implementation comprises, from the point C1 to C3, a serpentine border formed by flowing lines. Relative to the center of the internal part of virtual window, this left lateral border, from the point C1 to C3, is preferably formed by a concavity followed by convexity which is followed by a concavity. As the virtual window is symmetric, the right lateral border of the internal part of the virtual window (3) is a mirrored line of the left border.

According to FIG. 3, the angle between the lines formed by points C2C1 and C1C6 is obtuse. By symmetry, the angle formed by the lines C5C6 and C6C1 is obtuse. The line 4 represents the line of symmetry.

As can be seen in FIG. 4, the external part of the virtual window may comprise a paint scheme that represents the same geometry as the internal part of the virtual window. This paint scheme gives to the virtual window the visual effect that emulates the extending of the windshield until a given intermediate section of the upper region of the aircraft fuselage.

Alternatively, the external part of the virtual window may comprise a paint scheme that represents the similar geometry of the internal part of the virtual window.

FIG. 4 shows the external part of the virtual window (3). In this figure, it is observed that the windshield of the aircraft is composed of units represented by the numbers 5, 6, 7 and 8. The lower border of the external part of virtual window (3) is parallel to the line formed by the windshield parts (5, 6, 7 and 8).

The region of the cabin near the virtual window may contain a sofa, as illustrated in FIG. 2, or other type of furniture or structure such as seats or a bed. Imagine meditating, drifting off to sleep, etc. with a panoramic view of the sky and clouds spread out before you. The night sky would be magnificent in such a panoramic view, and the day sky with clouds, birds, other aircraft etc. would provide endless fascination.

Figure 5:
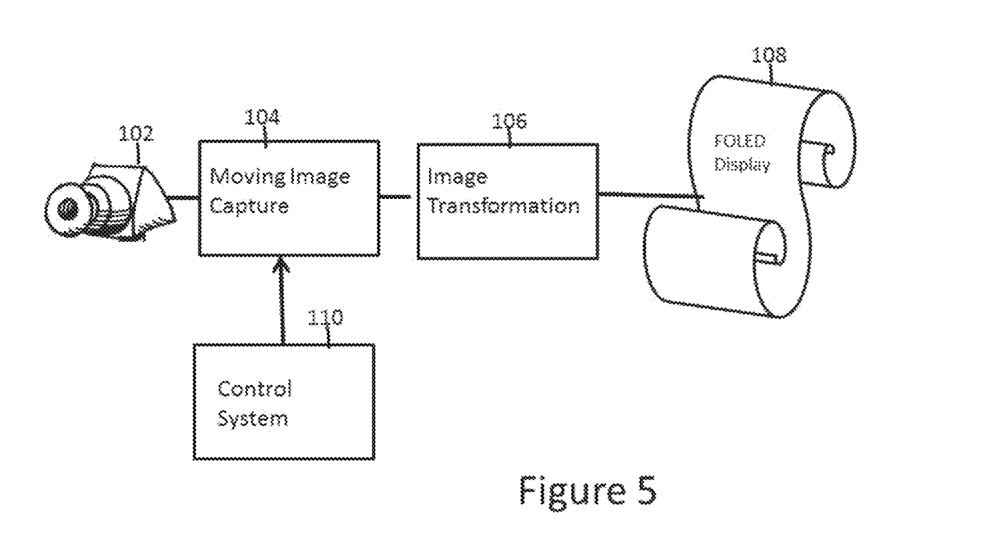
FIG. 5 shows an example non-limiting schematic block diagram of an image processing system.

As shown in FIG. 5, the data processing system shown, through software, may provide the presentation of the exterior images in the flexible display according to the internal structural configuration in the forward region of the cabin. In particular, a front-facing camera 102 positioned on the outside of the aircraft may capture moving color images in real time of the sky and horizon in front of the airplane. An image processing module 104 may process the captured images in a conventional fashion under control of a control system 110. An image transformation module 106 may, under software control, transform or warp the image appropriately to match the perspective of viewers within the airplane's interior. For example, if in the region near to the flexible display there is a sofa, as illustrated in FIG. 2, the data processing system image transformation module 106 may provide the presentation of the images in certain way (at a certain angle of view, for example). On the other hand, if near the flexible display there are seats instead of sofa, the data processing system image transformation module 106 may provide the presentation of images in another way (at other angle of view, for example). This different way of image presentation provides the best visualization for the passengers so that they may enjoy the images from the horizon during the flight. The resulting transformed image may be displayed on a high resolution FOLED or other suitable electronic display device 108 within the interior of the aircraft. Preferably, the control module 110 is designed to display appropriate images on display 108 whenever the airplane is powered on but not yet moving to avoid destroying the illusion of a window.

Another example non-limiting embodiment may be implemented by installing in the outside part of the aircraft, instead of a paint scheme, another flexible display (a FOLED display, for example) which may show the internal aircraft viewing captured by a camera installed inside of the airplane. This provides the illusion and functionality of a two-way transparent window. A polycarbonate layer may be applied over this external flexible display in order to avoid aerodynamic erosion. Such external flexible display, alternatively, may also show advertising messages or even any other kind of visual communication such as videos, movies, pictures or illustrations.

The internal flexible display also, alternatively, may show advertising messages or even any other kind of visual communication such as videos, movies, pictures or illustrations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An aircraft virtual panoramic window comprising:
   an electronic display mounted within a fuselage of an aircraft in substantial conformity with a curved inside surface of the aircraft fuselage and configured to appear to be a panoramic window opening through the aircraft fuselage;
   a visual presentation disposed on a curved outside surface of the aircraft fuselage in substantial registry with the electronic display mounted on the curved inside surface within the aircraft fuselage, the visual presentation comprising a visible coating or decal that passes no light through the fuselage yet appears from outside the aircraft fuselage to be a panoramic window opening that passes light from outside the aircraft through the fuselage into an interior space within the aircraft fuselage; and
   an image generator that generates panoramic images of what would be seen if looking through the panoramic window opening through the aircraft fuselage, the image generator being operatively connected to the electronic display to display on the electronic display the generated panoramic images of what would be seen if looking through the aircraft fuselage.

2. The virtual window of claim 1 wherein the electronic display comprises a folded display mounted in conformity with an inside surface of the aircraft fuselage and is bounded by curves.

3. The virtual window of claim 1 wherein the image generator comprises a camera mounted outside the aircraft and an image processor coupled to the camera, the image processor warping images captured by the camera and providing the warped images for display by the electronic display.

4. The virtual window of claim 1 wherein the electronic display comprises a flexible organic light emitting diode screen display.

5. The virtual window of claim 1 wherein the image generator comprises an image transformer coupled to the electronic display, the image transformer transforming images the electronic display displays depending on the position of viewers within the aircraft fuselage.

6. The virtual window of claim 1 wherein the visual presentation comprises paint.

7. The virtual window of claim 1 wherein the visual presentation comprises a decal.

8. A method of providing a virtual panoramic window on an aircraft of the type comprising a hollow aircraft fuselage defining an outer curved surface and further comprising an inner curved surface at least in part defining an interior passenger compartment therein, the method comprising:
   mounting a conformal electronic display within the aircraft fuselage interior passenger compartment in substantial conformity with the aircraft fuselage inner curved surface to provide a virtual curved panoramic window opening through the aircraft fuselage;
   disposing a visual presentation on the aircraft fuselage outer curved surface in substantial registry with the electronic display mounted within the aircraft fuselage interior passenger compartment, the virtual presentation resembling the curved panoramic window opening through the aircraft fuselage, the visual presentation comprising a surface coating or decal that passes no light through the aircraft fuselage into the aircraft fuselage passenger compartment yet appears from outside the aircraft fuselage to be the panoramic window opening that passes light into the aircraft fuselage interior passenger compartment; and generating for display, on the electronic display, panoramic images of what would be seen if looking out of the virtual panoramic window opening through the aircraft fuselage.

9. The method of claim 8 wherein the electronic display mounting comprises mounting a folded display mounted in conformity with the inner curved surface within the aircraft fuselage.

10. The method of claim 8 further including mounting a camera outside the aircraft, and displaying on the electronic display, panoramic images captured by the camera.

11. The method of claim 8 wherein displaying includes transforming images for display on a flexible organic light emitting diode screen display depending on the position of viewers within the aircraft.

12. The method of claim 8 wherein disposing comprises painting.

13. The method of claim 8 wherein disposing comprises decaling.

14. The aircraft virtual window of claim 1 wherein the electronic display comprises an internal screen positioned on the aircraft ceiling in the forward region of a cabin adjacently to a windshield, the internal screen being bounded by curves.

15. The aircraft virtual window of claim 14 wherein the virtual presentation has a paint scheme that gives to the virtual presentation a visual effect that emulates extending a panoramic cockpit windshield to an intermediate section of an upper curved region of the aircraft fuselage.

16. The aircraft virtual window of claim 1 wherein the virtual presentation comprises a paint or decal scheme that is structured as an actual panoramic window and which is placed on the curved outside surface of the aircraft fuselage in registry with the conformal display in the interior of the aircraft fuselage.

17. The aircraft virtual window of claim 1 wherein the electronic display shows images that are consistent with what the virtual presentation being an actual panoramic window opening through the aircraft fuselage at that location, thereby creating the illusion of looking through a real panoramic window opening through the aircraft fuselage.

18. The method of claim 8 wherein the display comprises an internal screen and the mounting comprises positioning the internal screen on the aircraft ceiling in the forward region of the cabin adjacently to a panoramic cockpit windshield.

19. The method claim 18 wherein disposing comprises painting to give to the virtual presentation a visual effect that emulates extending the panoramic cockpit windshield onto an intermediate section of the upper region of the aircraft fuselage.

20. The method of claim 8 wherein disposing comprises painting or decaling on the outer curved surface of the aircraft fuselage in registry with the conformal display.

21. The method of claim 8 further including displaying warped images that are consistent with what the virtual presentation being an actual panoramic window, thereby creating the illusion of looking through a real panoramic window through the aircraft fuselage.

22. The method of claim 21 wherein the virtual presentation emulates a panoramic window opening with a solar film.

23. The aircraft virtual window of claim 1 wherein the virtual presentation emulates a panoramic window opening with a solar film.

* * * * *